United States Patent
Jovanovic et al.

(10) Patent No.: US 11,552,563 B2
(45) Date of Patent: Jan. 10, 2023

(54) VOLTAGE REGULATOR WITH DV/DT DETECTION

(71) Applicant: Apple Inc., Cupertino, CA (US)

(72) Inventors: Nikola Jovanovic, Munich (DE); Michael Couleur, Rottach-Egern (DE); Siarhei Meliukh, Munich (DE)

(73) Assignee: Apple Inc., Cupertino, CA (US)

(*) Notice: Subject to any disclaimer, the term of this patent is extended or adjusted under 35 U.S.C. 154(b) by 65 days.

(21) Appl. No.: 16/951,678

(22) Filed: Nov. 18, 2020

(65) Prior Publication Data

US 2022/0158555 A1  May 19, 2022

(51) Int. Cl.
- *H02M 3/156* (2006.01)
- *H02M 1/00* (2006.01)
- *G05F 1/565* (2006.01)

(52) U.S. Cl.
CPC ....... *H02M 3/1566* (2021.05); *H02M 1/0025* (2021.05); *G05F 1/565* (2013.01)

(58) Field of Classification Search
CPC .... H02M 1/0025; H02M 3/1566; G05F 1/565
See application file for complete search history.

(56) References Cited

U.S. PATENT DOCUMENTS

| | | | |
|---|---|---|---|
| 8,436,592 B2 | 5/2013 | Saitoh | |
| 9,467,051 B2 | 10/2016 | Stoichita et al. | |
| 9,755,519 B1* | 9/2017 | Huang | H02M 1/08 |
| 9,899,921 B1 | 2/2018 | Paduvalli | |
| 10,491,207 B2 | 11/2019 | Norling et al. | |
| 10,749,433 B2 | 8/2020 | Kobayashi et al. | |
| 10,770,973 B1* | 9/2020 | Chen | H02M 3/158 |
| 2009/0146634 A1* | 6/2009 | Audy | H02M 3/156 323/290 |
| 2012/0194145 A1* | 8/2012 | Sheng | H02M 3/156 323/234 |
| 2014/0009978 A1* | 1/2014 | Brinlee | H02M 3/01 363/25 |
| 2016/0087530 A1* | 3/2016 | Gambetta | H02M 3/158 323/271 |
| 2019/0280590 A1* | 9/2019 | Lee | H02M 3/156 |
| 2020/0007036 A1* | 1/2020 | Li | H02M 3/158 |
| 2020/0014299 A1* | 1/2020 | Sun | H02M 3/1588 |
| 2021/0143735 A1* | 5/2021 | You | H02M 3/1584 |

OTHER PUBLICATIONS

Sheehan, Robert, Understanding and Applying Current-Mode Control Theory, Texas Instruments literature No. SNVA555 Power Electronics Technology Exhibition and Conference, Dallas, TX, Oct. 31, 2007. (Year: 2007).*

* cited by examiner

*Primary Examiner* — Fred E Finch, III
(74) *Attorney, Agent, or Firm* — Kowert, Hood, Munyon, Rankin & Goetzel, P.C.; Erik A. Heter; Dean M. Munyon

(57) ABSTRACT

A power converter is disclosed. The power converter is configured to provide a regulated output voltage. The power converter includes a first control loop configured to generate a first voltage based on a rate of change of the regulated output voltage. A second control loop is configured to generate a second voltage based on an output current provided by the power converter. An amplifier is configured to generate a third voltage based on the first and second voltages. A control circuit is configured to control the regulated output voltage based on the third voltage.

20 Claims, 9 Drawing Sheets

VOLTAGE REGULATOR WITH DV/DT DETECTION

BACKGROUND

Technical Field

This disclosure is directed to power converter circuits, and more particularly, to detecting parameters of power converter circuits during operation.

Description of the Related Art

Switching power converters are well known in the electronic arts. Switching power converters include buck converters, in which the output voltage is less than the input voltage, and boost converters, in which the output voltage is greater than the input voltage. Such switching converters may trade voltage and current in the buck or boost operation, and may provide greater efficiency than linear voltage regulators.

One of the challenges of designing switching power converters is the design of their respective control loops. These control loops may in some instances rely on compensation schemes that can be classified as, e.g., Type I compensation, Type II compensation, and Type III compensation. In Type I compensation, a conventional error amplifier may be used, with the transfer function having a single pole. In Type II compensation, a transconductance amplifier may be used, with two poles in the transfer function. In Type III compensation, the compensation network provides a pole at the origin, two zeros, and two high frequency poles. Type I compensation is thus the simplest, while Type III compensation is the most complex, and is useful for compensating voltage mode converters. Type II compensation is useful for current mode converters, and may provide decoupling of DC regulation and AC bandwidth.

SUMMARY

A power converter is disclosed. In one embodiment, a power converter is configured to provide a regulated output voltage. The power converter includes a first control loop configured to generate a first voltage based on a rate of change of the regulated output voltage. A second control loop is configured to generate a second voltage based on an output current provided by the power converter. An amplifier is configured to generate a third voltage based on the first and second voltages. A control circuit is configured to control the regulated output voltage based on the third voltage.

In one embodiment, the power converter is a switching voltage regulator, such as a buck converter. The first control loop includes an error amplifier configured to generate an initial value of the first voltage based on a difference between the regulated supply voltage and a reference voltage. A slope detection circuit in the first control loop is configured to generate a current based on a rate of change of the regulated supply voltage. In one embodiment, a compensation circuit is coupled between an output of the slope detection circuit and the output of the error amplifier. The current output from the slope detection circuit is provided to the compensation network to cause the first voltage to be modified.

BRIEF DESCRIPTION OF THE DRAWINGS

The following detailed description makes reference to the accompanying drawings, which are now briefly described.

DETAILED DESCRIPTION OF EMBODIMENTS

Figure 1:
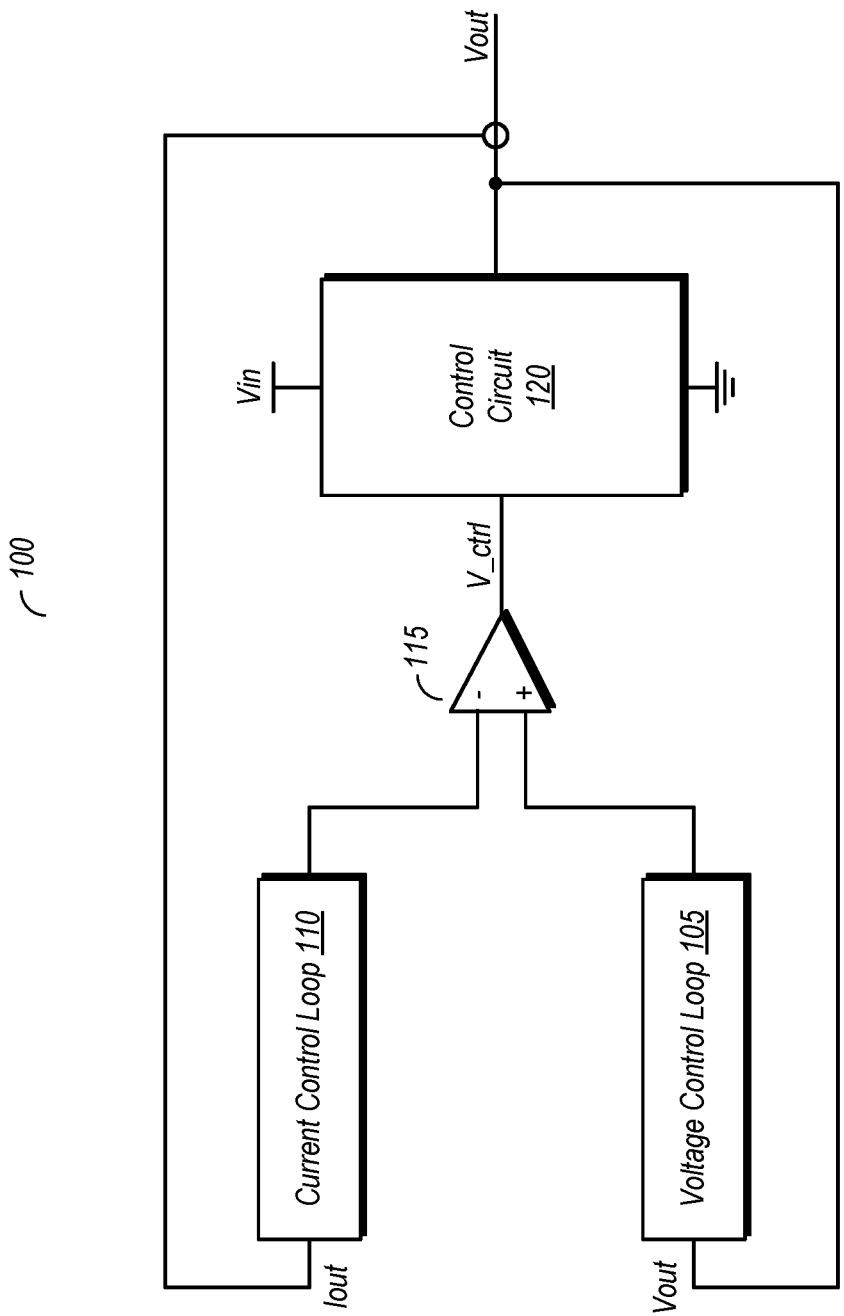
FIG. 1 is a diagram of one embodiment of a voltage regulator.

The present disclosure is directed to a power converter that includes a circuit for detecting the rate of change of an output voltage in the control loop. In one embodiment, the power converter is a switching voltage regulator that includes Type II compensation along with a non-linear dv/dt (or slope) detection circuit, which may detect a slope indicative of a rate of change of the output voltage.

Various types of voltage regulators (e.g., switching regulators) may be designed to regulate the output voltage against changes in output loading, from, e.g., transients that can occur for various reasons. These types of voltage regulators typically include a control loop having an error amplifier with linear feedback. The control loop may define a bandwidth of the switching voltage regulator. Compensation may be added to the control loop in order to adjust the loop bandwidth and further refine the frequency of the control loop. Various types of compensation may be utilized. These types include Type I compensation, which provides voltage mode compensation, and Type II compensation, which provides current mode compensation. Type II compensation may be utilized in applications in which it is desired to decoupled DC load regulation from AC bandwidth. However, Type II compensation on its own assumes a fixed rate of change of the output voltage, which may limit its ability to respond to some transients.

The dv/dt detection (e.g., detecting the rate of change of the output voltage at a given instant) performed in various may allow for fast reaction to load transients. The circuit of the present disclosure is directed to a power converter in which Type II compensation is combined with dv/dt detection, which are combined together in the control loop of a voltage regulator.

In one embodiment, a power converter in accordance with the disclosure includes a voltage control loop and a current control loop. The current control loop may perform Type II compensation based on an output current of the power. The voltage control loop may include a first error amplifier and a slope detection circuit. The first error amplifier may generate an error signal based on a difference between a reference voltage and an output voltage of the power converter. The slope detection circuit may detect a rate of change of the output voltage and generate a current that is used to modify the error signal. The modified error signal and the output of the current control loop may then be input into another error amplifier, which may generate a control signal used to, e.g., control a switching mode of a switch control circuit.

A power converter according to this disclosure may be one of a number of different types. These types include switching regulators such as boost and buck converters, and may also apply to linear voltage regulators such as a low dropout (LDO) regulator. The disclosure that follows begins with discussion of a general power converter (which may be any of the types discussed above) that includes both a current control loop and a voltage control loop. This is followed by discussion of an example switching voltage regulator, with additional details of current and voltage control loop embodiments is provided. Thereafter, a further details of an embodiment of a voltage control loop are discussed, including a detailed discussion of one embodiment of a slope detection circuit. Discussions of an example integrated circuit including an embodiment of a power converter according to the present disclosure, a method for operating a power converter, and an example system are provided.

Power Converter with Voltage and Current Control Loops:

FIG. 1 is a block diagram of one embodiment of a power converter according to the present disclosure. In the embodiment shown, power converter 100 may be one of a number of different types of circuit configured to output a regulated supply voltage. In various embodiments, power converter 100 may a switching converter such as a buck converter or boost converter. Embodiments in which power converter 100 is a linear voltage regulator, such as an LDO regulator, are also possible and contemplated. Generally speaking, power converter 100 may be any type of circuit that provides a regulated output voltage while implementing the control loops shown here.

Power converter 100 in the embodiment shown includes a control circuit 120, which is coupled to receive an input voltage, Vin, and provide an regulated output voltage, Vout. Generally speaking, control circuit 120 may comprise any type of circuitry that is used to control the regulated supply voltage based on the received feedback and the desired output voltage. Control circuit 120 may include various components, depending on the particular type of power converter. For example, in embodiments where power converter 100 is a buck converter, control circuit 120 may include a high side transistors, a low side transistor, and a switch control circuit. In an embodiment in which power converter is implemented as and LDO voltage regulator, control circuit 120 may comprise a power transistor.

Power converter 110 in the embodiment shown includes an amplifier 115, which generates and provides a control voltage to control circuit 120. In various embodiments, the control voltage may represent a difference between a desired output voltage and the actual output voltage at a given time. Control circuit 120 may adjust the regulated output voltage, Vout, based on the control signal.

Amplifier 115 includes, in the embodiment shown, an inverting input and a non-inverting input. The inverting input is coupled to a current control loop 110, which is coupled to receive and is responsive to the output current provided by power converter 100. The output current may be taken from any suitable location in power converter 100. In various embodiments, current control loop 110 implements Type II compensation, which provides current mode control. More particularly, current control loop 110 is configured to respond to current transients (e.g., changes in demand current). Current control loop 110 may generate a voltage that is based on the current. This voltage may be received on the inverting input of amplifier 115.

The non-inverting input of amplifier 115 is coupled to voltage control loop 105, which provides voltage mode control. Voltage control loop 105 is coupled to the output voltage node and is thus coupled to receive the output voltage as a feedback signal. Voltage control loop 105 is configured to generate an error signal based on two different aspects of the output voltage. A first aspect is a the presently received value (e.g., amplitude) of the output voltage. A second aspect is the rate of change (which may be referred to as dv/dt) of the presently received output voltage. As will be discussed in further detail below, voltage control loop 105 includes an error amplifier and a slope detection circuit. The error amplifier may generate an error signal based on a difference between a reference voltage and the presently received value of the output voltage. The slope control circuit may perform dv/dt detection, thereby determining a rate of change of the output voltage as presently received, and generate a corresponding current. This current may be received by a compensation network coupled between an output of the slope detection circuit and the output of the error amplifier. Based on the current received from the slope detection circuit, the compensation circuit may modify the error voltage output from the error amplifier. This modified error voltage may be provided to the non-inverting input of amplifier 115.

Accordingly, in various embodiments, power converter 100 includes both voltage mode control and current mode control for regulating the output voltage. Furthermore, in various embodiments, power converter 100 provides Type II compensation combined with dv/dt detection with respect to the output voltage. This allow a decoupling of DC load regulation from AC bandwidth (due to the Type II compensation) while allowing fast response to transient currents (due to the dv/dt detection).

Figure 2:
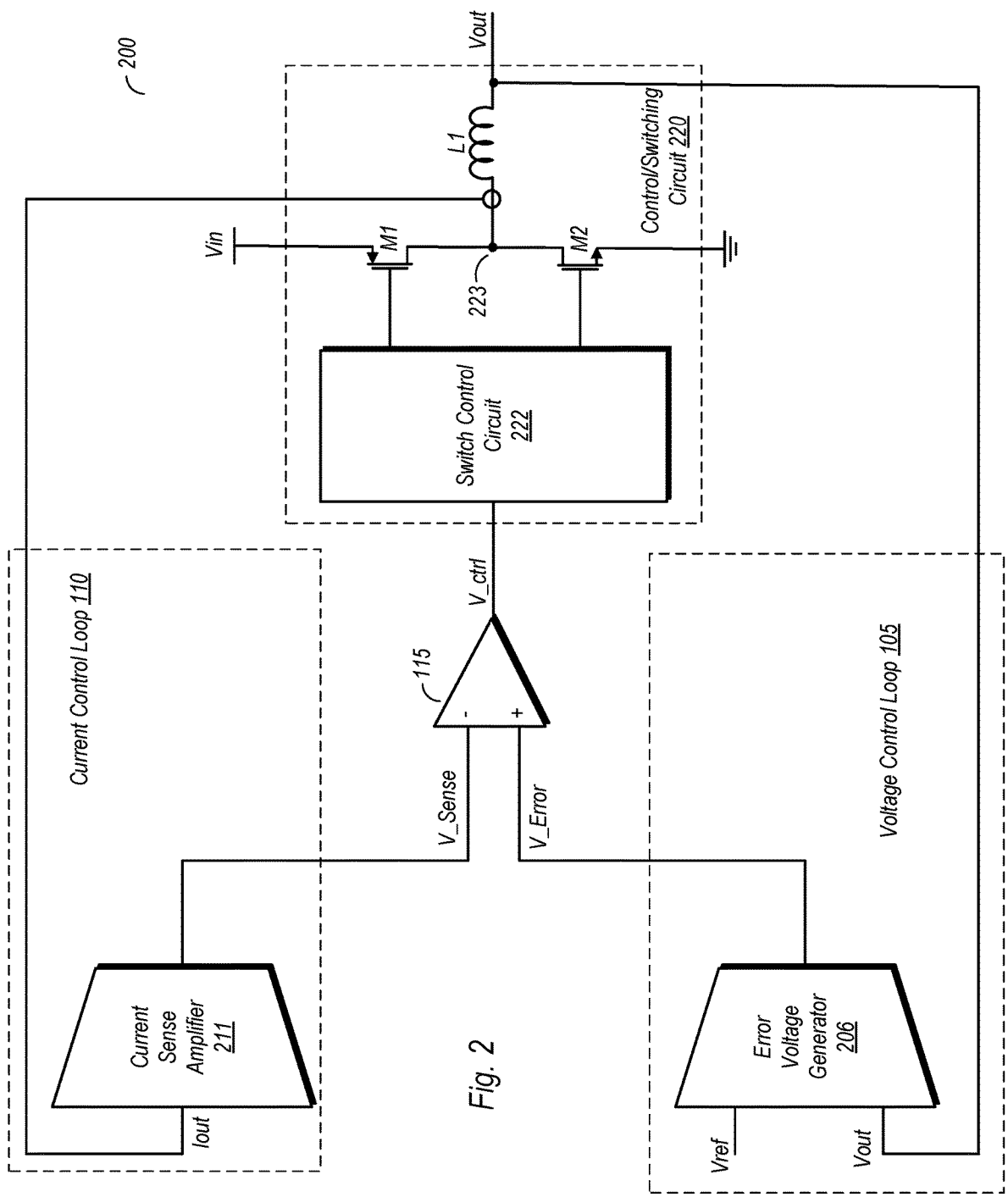
FIG. 2 is a diagram of one embodiment of a switching voltage regulator.

Switching Voltage Regulator and Control Loops:

FIG. 2 is a diagram of one embodiment of a switching voltage regulator 200 that includes voltage and current control loops. In the embodiment shown, switching voltage regulator 200 is a buck converter configured to provide an output voltage, Vout, at a voltage level that is less than that of the input voltage, Vin. It is noted that the buck converter embodiment is shown here by way of example, and is not intended to limit the disclosure to this particular type of regulator.

In the embodiment shown, control/switching circuit 220 performs the function of control circuit 120 of FIG. 1, namely controlling the level of the output voltage. Control/switching circuit 220 includes a high side transistor M1 and a low side transistor M2, the respective drain terminals of which are coupled to a switching node 223. An inductor L1 is coupled between switching node 223 and the output node, Vout.

Switching control circuit 222 in the embodiment shown controls the state of transistors M1 and M2. These transistors may be alternately activated and de-activated with respect to one another. Transistor M1 may be activated to pull the switching node up toward the input voltage, Vin, while transistor M2 is inactive. Transistor M2 may be activated while transistor M1 is inactive, thereby pulling the voltage on switching node 223 toward ground. Energy may be transferred to and stored in inductor L1, which may alternately charge and discharge in accordance with the switching of transistors M1 and M2. Over time, the output voltage may be an averaged out to a substantially DC voltage that is regulated to within a range of a desired voltage.

Switching control circuit 222 may control switching of transistors M1 and M2 in various modes in accordance with the current demanded by a load circuit. In various embodiments, the different modes may adjust the duty cycle of the transistors to achieve the desired output current and thus maintain the output voltage at or near a desired value. These modes include pulse frequency modulation (PFM) and pulse width modulation (PWM). The PFM mode may be used for lower demand currents, and may include switch control circuit 222 causing a sequence of pulses (e.g., by activating M1) that are substantially equal in width. The frequency of these pulses may be varied in accordance with the current demand. The PWM mode may be used for higher demand currents, and may include varying the width of pulses in accordance with the demand current (e.g., wider pulses for higher demand currents).

Because the demand current can change due to changing demands by a load circuit coupled to switching voltage regulator 220, feedback control loops are provided to enable switch control circuit 222 to control the output voltage by selecting an appropriate mode and appropriate frequency or pulse width. Switch control circuit 222 is coupled to receive a control signal, V_ctrl, from an amplifier 115. The inputs to amplifier 115 include a first voltage, V_Error, from voltage control loop 105, and a second voltage, V_Sense, from current control loop 110. In the embodiment shown, amplifier 115 receives V_error on its non-inverting input and V_Sense on its inverting input.

Voltage control loop 105 in the embodiment shown includes an error voltage generator 206. The error voltage generator 206 is coupled to receive the output voltage, Vout, on a first input, and a reference voltage Vref, on a second input. The reference voltage may be generated by any suitable circuitry capable of generating a voltage that remains substantially fixed over some amount of time, and may correspond to a desired output voltage. Error voltage generator 206 may generate V_error based on the difference between Vout and Vref, as well as on the rate of change (or dv/dt) of Vout.

Current control loop 110 is coupled to receive an output current, Iout, provided by switching voltage regulator 200. In this particular embodiment, current control loop 110 is coupled to receive the current through the switching node, although the output current (or current corresponding thereto) may be taken from another location (e.g., the Vout node). Current control loop 110 includes a current sense amplifier 211, which may be any suitable amplifier that may generate an output voltage that corresponds to an input current. The output of current sense amplifier, the voltage V_sense, is provided to the non-inverting input of amplifier 115. Based on the difference between V_error and V_sense, amplifier 115 generates the control signal, V_ctrl. Using this control signal, switch control circuit 222 may control the switching of transistors M1 and M2 in a manner to bring the output voltage to within the desired range while providing the desired current to the load circuit.

Figure 3A:
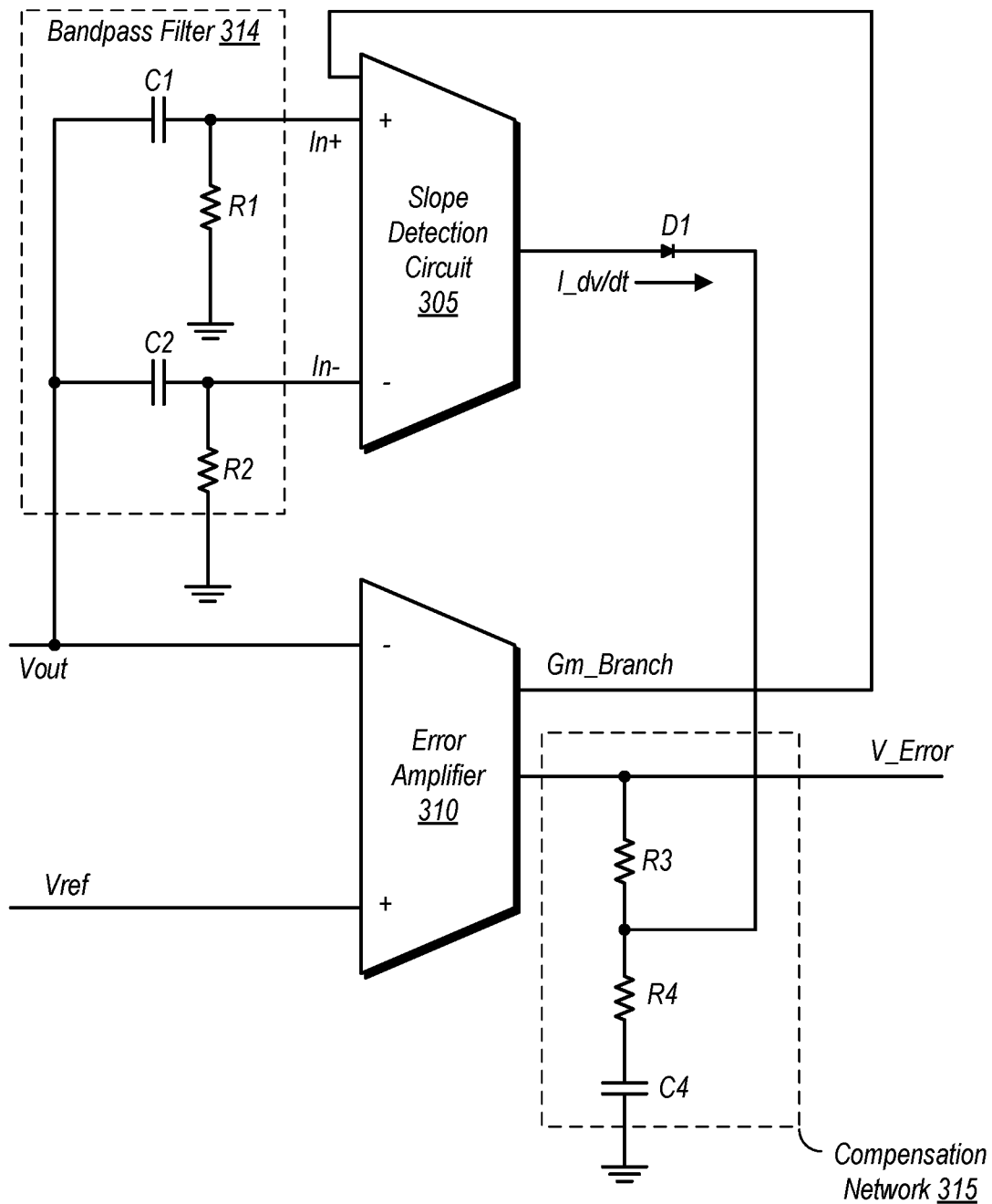
FIG. 3A is a diagram illustrating details of one embodiment of an error voltage generator used in an embodiment of a switching voltage regulator.

FIG. 3A illustrates one embodiment of an error voltage generator 206. In the embodiment shown, error voltage generator 206 includes two main components, a slope detection circuit 305 and an error amplifier 310. A bandpass filter (comprising C1, R1, C2, and R2) is provided on the inputs of slope detection circuit 305. The output of slope detection circuit 305 is coupled to the anode of diode D1, while a compensation network 315 is coupled between the cathode of D1 and the output of error amplifier 310. Compensation network 315 in the embodiment shown includes resistors R3 and R4, along with capacitor C4. It is noted that the embodiment of compensation network 315 is but one example, and other implementations are possible and contemplated. Generally speaking, compensation network 315 may be implemented with any suitable circuit arrangement that allows the V_error signal to be referenced to the amount of current that is desired to be delivered to the output node, Vout, for a given operating condition.

Error amplifier 310 in the embodiment shown is coupled to receive both the output voltage, Vout, and the reference voltage, Vref. In one embodiment, error amplifier 310 may be an operational transconductance amplifier (OTA), although the disclosure is not limited to this amplifier type. Based on the difference between the output voltage and the reference voltage, error amplifier 310 may generate an output voltage which is provided to the V_error node. However, this output voltage is modified in the illustrated embodiment by compensation network 315, as will be discussed in further detail below. Accordingly, V_error in the embodiment shown is a modified version of the output voltage generated by error amplifier 310 and provided to the amplifier 115 shown in FIGS. 1 and 2.

In addition to outputting an initial error voltage that is subsequently modified on the V_error node, error amplifier 310 is also coupled to provide a signal Gm_Branch to an input of slope detection circuit 305. This signal may be used by slope detection circuit 305 to modulate its own output and thereby reduce overshoot when responding to transients. Additional details for one embodiment are discussed below in reference to FIG. 4.

Bandpass filter 314 is coupled to the inputs of slope detection circuit 305. In the embodiment shown, bandpass filter is coupled to receive the output voltage, Vout, as an input, and is arranged to provide as outputs the In+ and In− signals to the inputs of slope detection circuit 305. Capacitor C1 is coupled between the Vout node and the In+ node, while resistor R1 is coupled between In+ and ground. Capacitor C2 is coupled between the Vout node and In− node, while R2 is coupled between In− and ground. In the embodiment shown, capacitor C1 is larger than that of C2, with the difference in the two capacitances causing the bandpass filtering, while the structure provides a differential output that is input to slope detection circuit 305. The differential structure may provide additional noise rejection, particularly at high frequencies. In general, bandpass filter 315 may substantially reject signals outside of a frequency band defined by the respective component values of R1, C1, R2, and C2.

Based on the input signals received, slope detection circuit 305 may detect the rate of change of the output voltage, dv/dt. In one embodiment, slope detection circuit is an OTA configured to generate an output current, I_dv/dt, based on the bandpass filtered differential voltage. The output current corresponds to the rate of change of the output voltage, Vout, at a given time or instant. The output current is passed through a diode to the junction of resistors R3 and R4 in compensation circuit 315. This current, when received at the junction of R3 and R4, modifies the output signal from error amplifier 310 to produce the error voltage value, V_error, that is provided to amplifier 115 of the embodiments in, e.g., FIGS. 1 and 2.

Thus, in light of the above, error voltage generator 206 may generate an output signal that is based on two different quantities related to the output voltage. The first of these quantities is the actual value of the output voltage at a given time, and the rate of change of the output voltage at the same time. The actual value of the output voltage at the given time is compared with the reference voltage using the error voltage generator, with an initial generation of an error voltage being based on this comparison. The rate of change of the output voltage at the given time is detected by slope detection circuit 305, which produces an output signal (a current in this particular embodiment) that is used to modify the initially generated error voltage. This modified value of the error voltage is used as one of the inputs into an amplifier (e.g., amplifier 115 of FIGS. 1 and 2) as a basis for generation of a control signal.

Figure 3B:
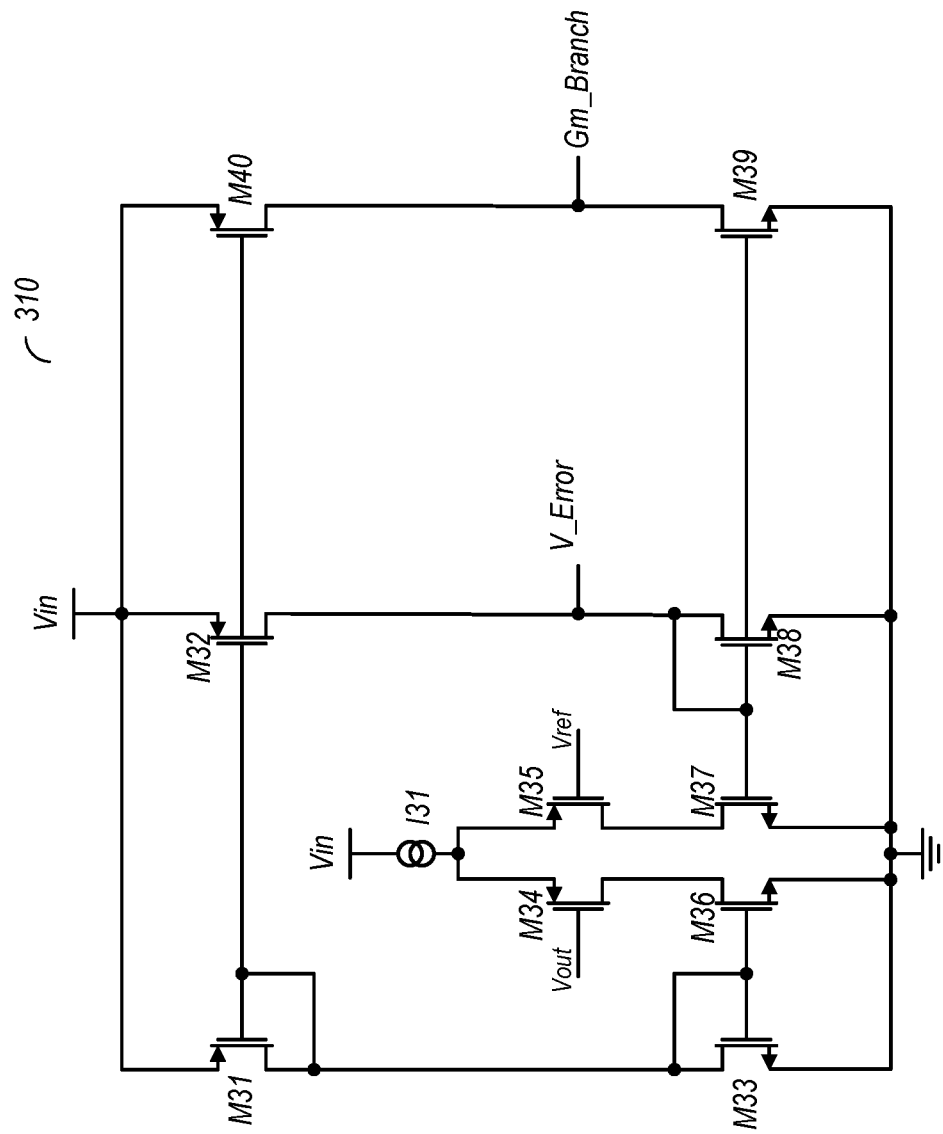
FIG. 3B is a diagram illustrating one embodiment of an error amplifier used to generate an error voltage.

FIG. 3B is a schematic diagram of one embodiment of an error amplifier that may be used in various embodiments of an error voltage generation circuit. In the embodiment shown, error amplifier 310 is an operational transconductance amplifier configured to produce two output signals, an error signal, V_error, and the modulation signal Gm_Branch. These output signals are produced based on respective levels of the input voltages, Vout and Vref. Moreover, these signals are output as currents, although the error signal becomes a voltage due to the presence of compensation network 315.

Error amplifier 310 in the embodiment shown includes a pair of PMOS transistor M34 and M35, which are coupled to receive Vout and Vref on their gate terminals, respectively. The source terminals of M34 and M35 are both coupled to a current source 131, which in turn is coupled to receive the input voltage, Vin. Furthermore, transistors M34 and M35 are arranged in a differential amplifier configuration. The drain terminals of M34 and M35 are coupled to drain terminals of NMOS transistor M36 and M37. Transistor M36 is part of a current mirror that also includes a diode-coupled device M33. Similarly, transistor M37 is part of a current mirror that includes the diode-coupled device M38.

Transistor M31 in the embodiment shown is a diode-coupled PMOS transistor having a respective drain terminal coupled to the drain terminal of M33. Additionally, transistor M31 is coupled to mirror a current to transistor M32 and M40. Each of PMOS transistors M31, M32, and M40 include respective source terminals coupled to receive the input voltage, Vin. Transistor M40 include a respective drain terminal coupled to a drain terminal of NMOS transistor M39.

Based on the difference between Vout and Vref, currents are produced in the circuit leg including M34 and M36 and the circuit leg including M35 and M37. This affects the current through M33 and M38, and thus the currents through M31 and M32, respectively. Based on the current through M32 and M38, the signal V_error is generated, which, in the embodiment of FIG. 3A, becomes a voltage on this node due to the presence of compensation network 315. This error voltage is modified due to the injection of the current I_dv/dt into compensation network 315, the current corresponding to a detected rate of change of the output voltage.

Additionally, the current through M31 is mirrored to M40, while the current through M38 is mirrored to M39. The current through these two devices results in the modulation signal, Gm_Branch. This signal is provided as a current to slope detection circuit as shown in FIG. 3A and further discussed below in reference to FIG. 4.

Figure 4:
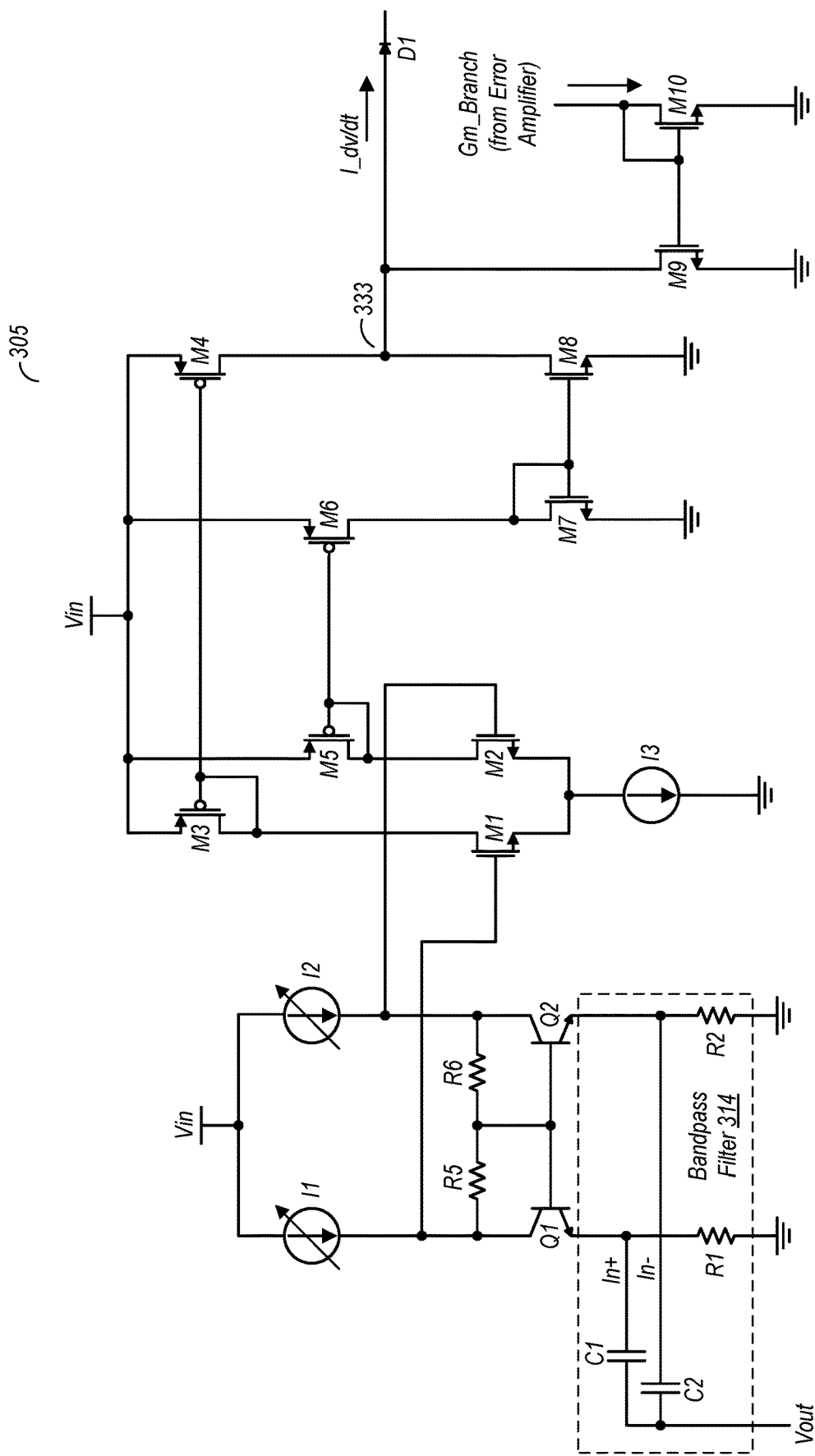
FIG. 4 is a schematic diagram illustrating one embodiment of a voltage control loop implemented a switching voltage regulator.

Example Slope Detection Circuit:

FIG. 4 is a schematic diagram illustrating one embodiment of a slope detection circuit implemented a switching voltage regulator. In the embodiment shown, slope detection circuit 305 is an operational transconductance amplifier that produces an output current, I_dv/dt, based on the feedback input from Vout of the voltage regulator in which it is implemented. Using slope detection circuit 305, the rate of change of the output voltage may be detected, with the corresponding output current being used to modify the error voltage.

Slope detection circuit 305 in the embodiment shown includes an input stage. The input stage includes current sources I1 and I2 and bipolar transistors Q1 and Q2. As noted in FIG. 3, a bandpass filter 314 is coupled to provide a differential input into slope detection circuit. The output voltage of the voltage regulator, Vout, is provided as an input into bandpass filter 314, which outputs a corresponding differential signal to the differential inputs In+ and In−. The In+ portion of the differential signal is received on an emitter terminal of bipolar transistor Q1, while the In− portion is received on the emitter of another bipolar transistor, Q2. Resistors R1 and R2 of bandpass filter 314 are coupled between the emitters of Q1 and Q2, respectively, and a ground node. Resistors R5 and R6 are coupled in series between the collectors of Q1 and Q2. The respective base terminals of Q1 and Q2 are coupled to one another and further coupled to the junction of R5 and R6.

While the present embodiment utilizes bipolar transistors as shown, it is noted that the disclosure is not limited in this manner. For example, Q1 and Q2 may be replaced in various embodiments by, e.g., NMOS transistors.

Current source I1 is coupled between the input voltage node, Vin, and the collector of Q1, while current source I2 is coupled between Vin and the collector of Q2. These current sources, along with resistors R5 and R6, set a voltage on the respective base terminals of Q1 and Q2. The current through current sources I1 and I2 in the embodiment shown is variable, and may vary with the amplitudes of the input signal components In+ and In−. Based on the respective amplitude of the differential input signal components, the input stage generates another differential signal that is provided to CMOS transistors M1 and M2 (which are NMOS devices in this embodiment). In particular, the gate terminal of M1 is coupled to the collector of Q1 while the gate terminal of M2 is coupled to the collector of Q2. Transistor M1 and M2 in the embodiment shown form an amplifier circuit that amplifies the differential signal received from the differential stage.

Slope detection circuit 306 in the embodiment shown includes three different current mirrors. A first of these current mirrors includes PMOS devices M3 and M4, the former being a diode-coupled device that is further coupled to a drain terminal of transistor M1. A second of these current mirrors includes PMOS devices M5 and M6, the former being a diode-coupled device that is further coupled to a drain terminal of M2. A third one of these current mirrors includes NMOS devices M7 and M8. The third current mirror is coupled to each of the first and second current mirrors. In particular, M7 (a diode-coupled device) is coupled to M5 of the second current mirror, while M8 is coupled to M4 of the first current mirror.

The respective drain terminals of M4 and M8 are coupled to one another at a current node 333. The current I_dv/dt on this node, prior to any modulation, is substantially proportional to the slope, or rate of change (dv/dt) of the output voltage, Vout. As noted in the discussion of FIG. 3, one embodiment of error voltage generator 206 is configured to generate a Gm_Branch signal that is received by slope detection circuit 305. This signal may be used to modulate the current I_dv/dt in an effort to minimize overshoots during transient responses. In the embodiment shown, a fourth current mirror comprised of NMOS devices M9 and M10 is included, with the latter device being diode coupled.

The Gm_Branch signal is received as a current by slope detection circuit 306 on the drain terminal of M10. The current through M10 is mirrored to M9, the drain terminal of which is coupled to current node 333. The current mirror comprising M9 and M10 is arranged such that the Gm_Branch current has an inverse relationship with the output current I_dv/dt. Thus, an increase in the Gm_Branch current may cause an decrease in the value of I_dv/dt output from slope detection circuit 305 (through diode D1). Accordingly, embodiments which implement a current mirror such as the one including M9 and M10 may thus modulate the I_dv/dt current to minimize overshoots when responding to transients. Nevertheless, the I_dv/dt may nevertheless be substantially proportional to the rate of change of Vout, thereby allowing faster responses to transient conditions. The I_dv/dt current output from slope detection circuit 305 is injected into the compensation network 315 and may thus cause a corresponding modification of the error voltage, V_Error, output from error amplifier 310.

It is noted that for the embodiments of a voltage regulator using a slope detection circuit 305 as discussed herein, the response may be unidirectional. That is, slope detection circuit may detect the rate of change of the output voltage on low-going transients in which the output voltage falls due to, for example, a sudden increase in current demanded by the load circuit. However, the response may be reduced for transients in which a rapid reduction in load current demand occurs, which can cause the output voltage to momentarily rise. As noted above, the relationship between the Gm_Branch current and I_dv/dt is an inverse relationship. Thus, if the Gm_Branch current falls (as may occur on high-going transients), the I_dv/dt current is affected less by the current mirror comprising M9 and M10, as a smaller amount of current is mirrored to M9.

Using the slope detection circuit 305 as part of the voltage control loop may allow a power converter to rapidly ramp up the output voltage in response to a low-going transient. For example, a switching voltage regulator operating in PFM mode may rapidly transit into a PWM mode to enable the regulator to respond to an increase current demand and to increase the output voltage back toward its desired value.

Figure 5:
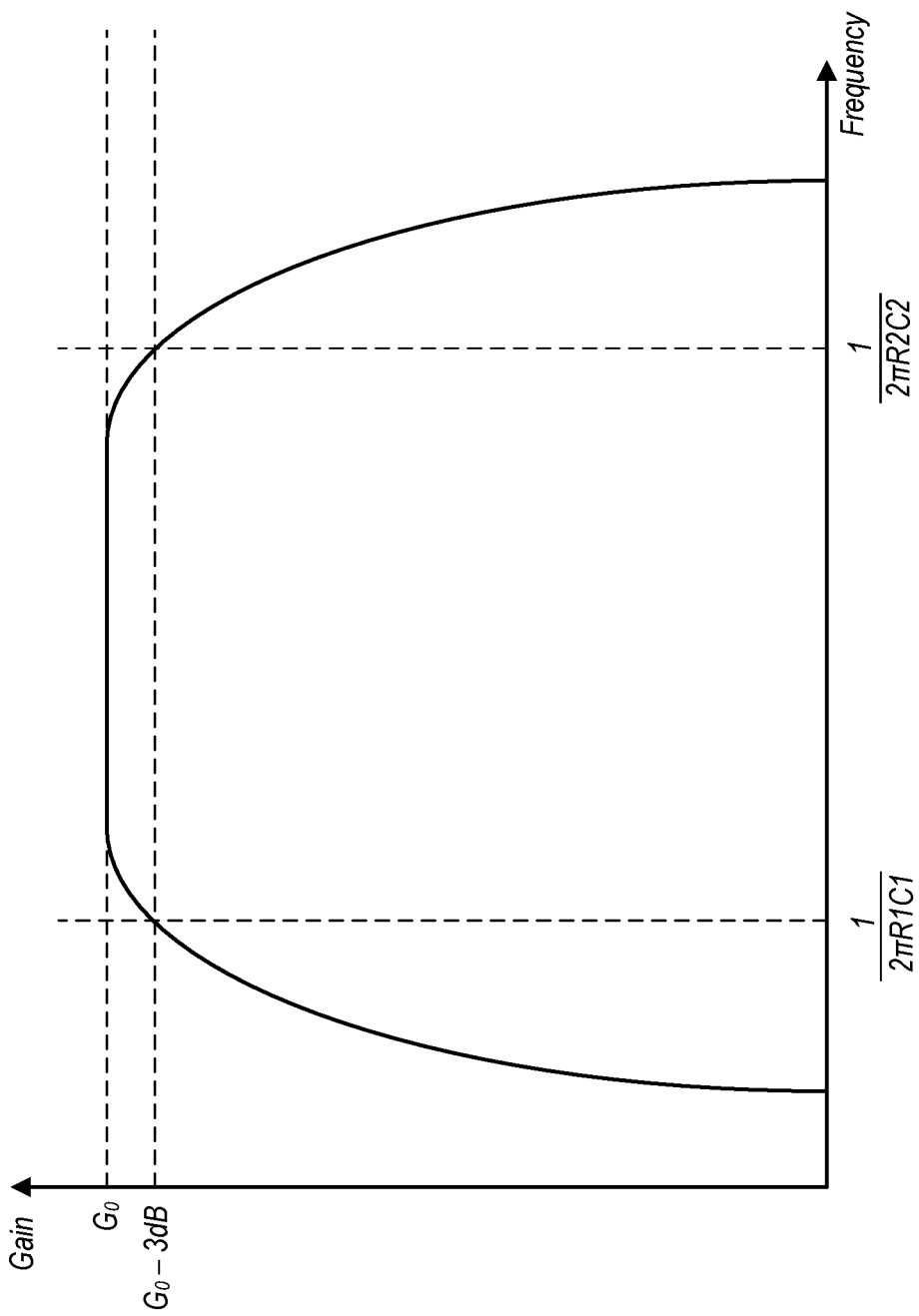
FIG. 5 is a graph illustrating a frequency response of an regulated supply voltage fed back as an input to one embodiment of a slope control circuit.

Example Bandpass Filter Response:

FIG. 5 is a graphic illustration of the frequency response for one embodiment of the bandpass filter 315 through which the Vout is input into slope detection circuit 315. In the embodiment shown, a lower end of the pass band is set by the values of the product of R1 and C1, while the upper end it set by the product of R2 and C2 (with the capacitance values dominating the response). These points represent the 3 dB (decibel) down points of the gain response ($G_0$–3 dB). Between these points, the gain response flattens out to a value of $G_0$. For an embodiment having a response approximating that shown here, the value of C1 is larger than C2.

Figure 6:
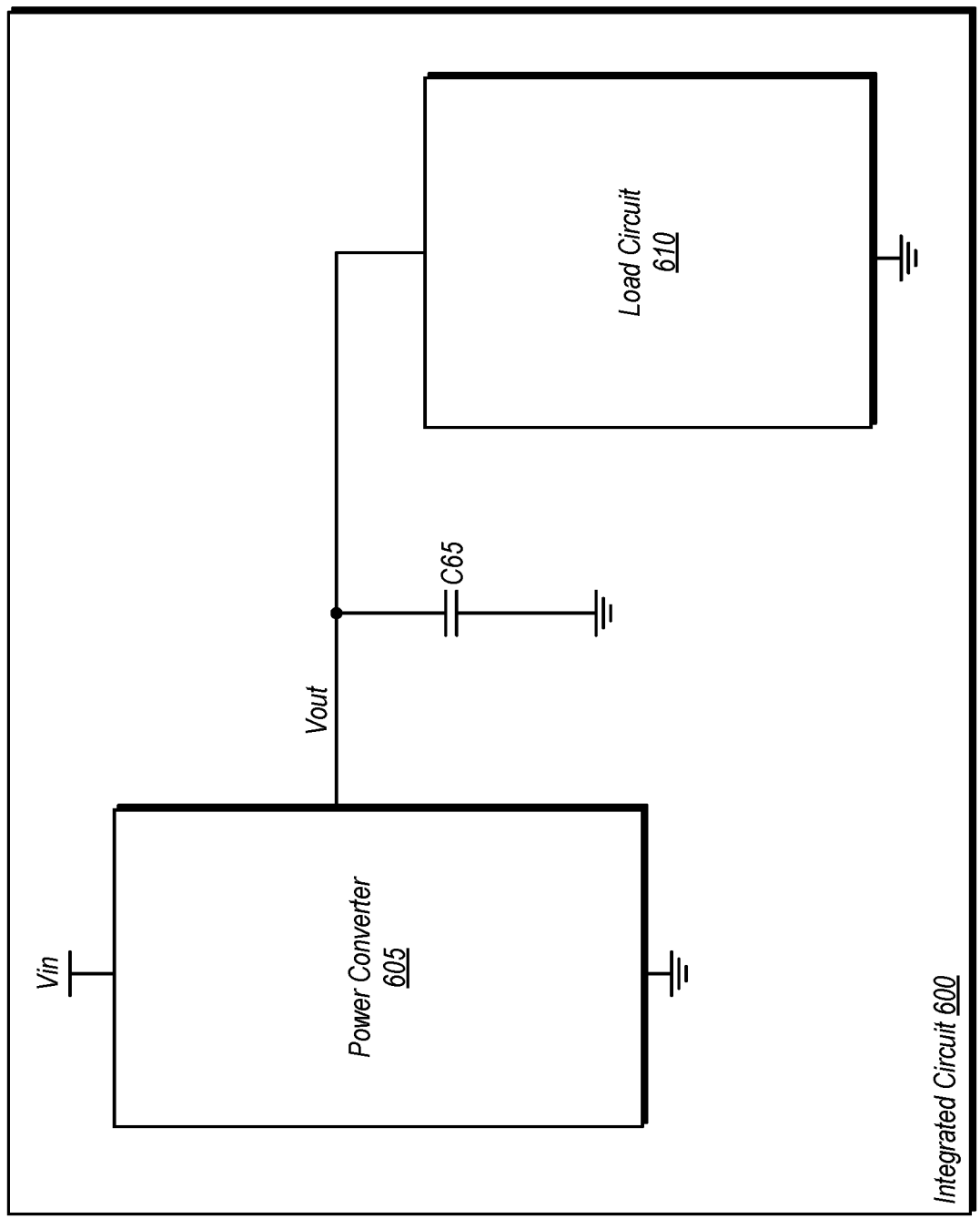
FIG. 6 is a block diagram of one embodiment of an integrated circuit having a switching voltage regulator and a load circuit.

Example Integrated Circuit:

FIG. 6 is a block diagram of an integrated circuit having a power converter and a load circuit. In the embodiment shown, integrated circuit 600 includes a power converter 605, which may be one of a number of different embodiments falling within the slope of this disclosure. In various embodiments, power converter 605 may be a switching voltage regulator (e.g., a buck regulator), a linear (e.g., LDO) voltage regulator, or other embodiment. Generally speaking, power converter 605 is configured to generate an regulated output voltage Vout based on an input voltage Vin. Per the present disclosure, power converter may include a voltage control loop and a current control loop, both of which are coupled to an amplifier which generates a control signal based on their respective outputs. With respect to the voltage control loop, both an error amplifier and a slope detection circuit may be implemented, in accordance with the discussion above. The error amplifier may generate an error voltage based on a difference between a feedback voltage (e.g., the regulated output voltage as directly coupled to an input of the error amplifier) and a reference voltage corresponding to a desired output voltage value. The slope detection circuit may generate a current corresponding to a rate of change dv/dt of the output voltage. The current generated by slope detection circuit may be used to modify the error voltage through, e.g., a compensation network. The control signal may be generated based on the outputs produced by the voltage and current control loops.

Load circuit 610 in the embodiment shown may be virtually any type of circuit that operates using a regulated supply voltage. Accordingly, load circuit 610 may include analog, digital, and/or mixed signal circuitry.

It is noted that in various embodiments, more than one load circuit may be coupled to power converter 605. It is further noted that embodiments are possible and contemplated in which power converter 605 and load circuit 610 are not implemented on the same integrated circuit.

Figure 7:
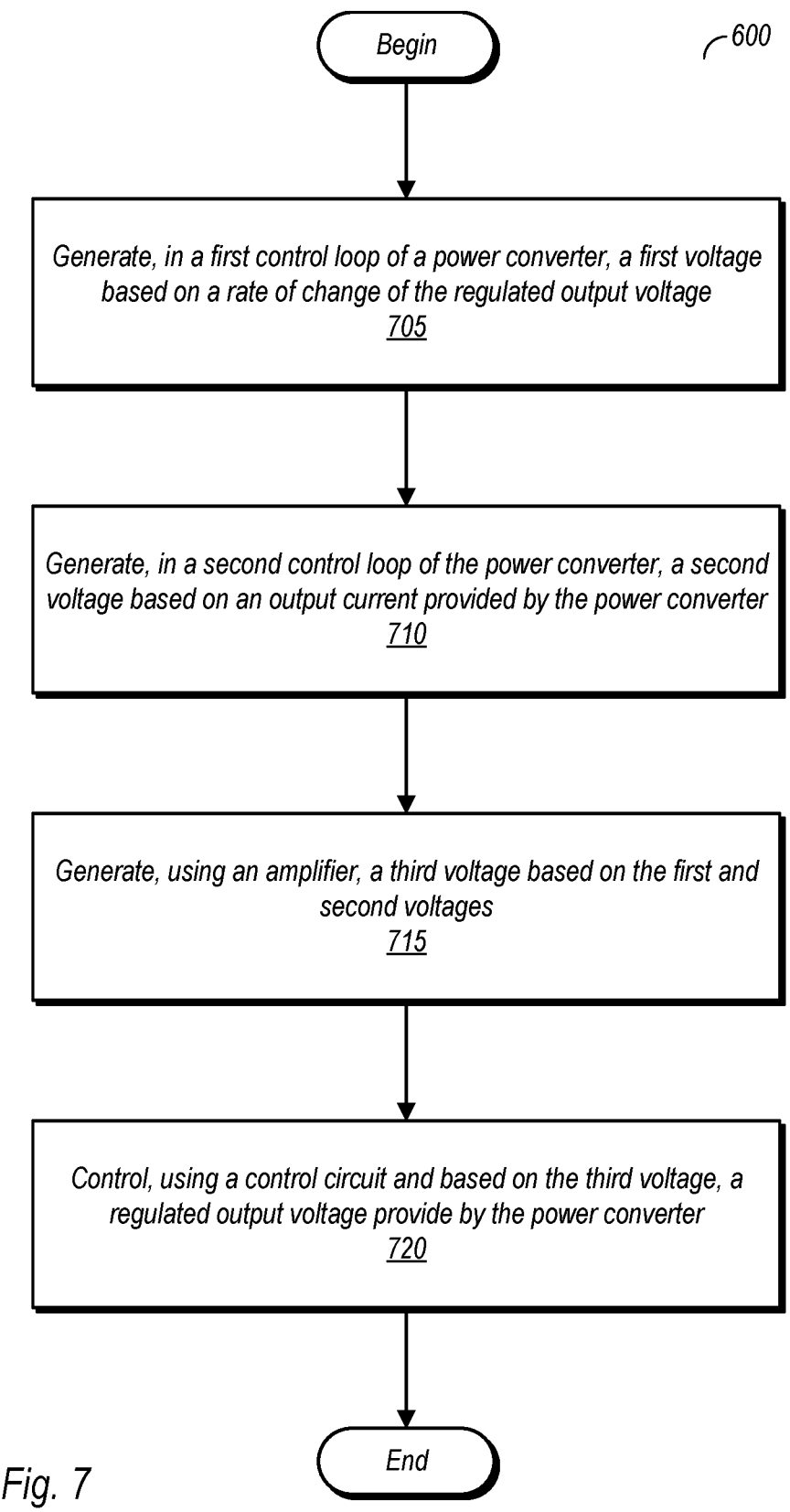
FIG. 7 is a flow diagram illustrating operation of one embodiment of a voltage regulator.

Method Flow:

FIG. 7 is a flow diagram of one embodiment is a flow diagram illustrating operation of one embodiment of a voltage regulator. Method 700 may be utilized with any of the circuit/apparatus embodiments discussed above. Apparatus/circuit embodiments not explicitly discussed herein but otherwise capable of carrying out Method 700 may be considered to fall within the scope of this disclosure.

Method 700 includes generating, in a first control loop of a power converter, a first voltage based on a rate of change of the regulated output voltage (block 705). The method further includes generating, in a second control loop of the power converter, a second voltage based on an output current provided by the power converter (block 710), and generating, using an amplifier, a third voltage based on the first and second voltages (block 715). Thereafter, the method includes controlling, using a control circuit and based on the third voltage, a regulated output voltage provide by the power converter (block 720).

In various embodiments, the method includes generating, using an error amplifier, an initial value of the first voltage based on based on a difference between the regulated supply voltage and a reference voltage. Such embodiments may further include modifying, using a slope detection circuit, the first voltage based on the rate of change of the regulated supply voltage.

Operations in the voltage control loop include, in various embodiment, generating a first current using the slope detection circuit and providing the first current to a compensation network, wherein the compensation network is coupled to an output of the error amplifier. Thereafter, the method includes modifying the first voltage, using the compensation network, based on the first current.

Various embodiments of the method also include generating, using the error amplifier, a modulation signal and modulating the first output current provided by the slope detection circuit, using the modulation signal, wherein the modulating includes varying an amount of the first output current with an amplitude of the modulation signal.

With regard to the voltage control loop, the method includes, in various embodiments, providing the regulated supply voltage through a bandpass filter to first and second inputs of a transconductance amplifier, wherein the transconductance amplifier of the slope detection circuit.

In one embodiment, the power converter is a switching voltage regulator, and more particularly, a buck converter (although the disclosure is not limited to this type of regulator). In the buck converter embodiment, controlling the regulated output voltage comprises the control circuit controlling switching of a first transistor coupled between an input voltage node and a switching node and the control circuit controlling switching of a second transistor coupled between the switching node and a ground node. The control circuit is configured to control switching of the first and second transistors in accordance with the third voltage.

Figure 8:
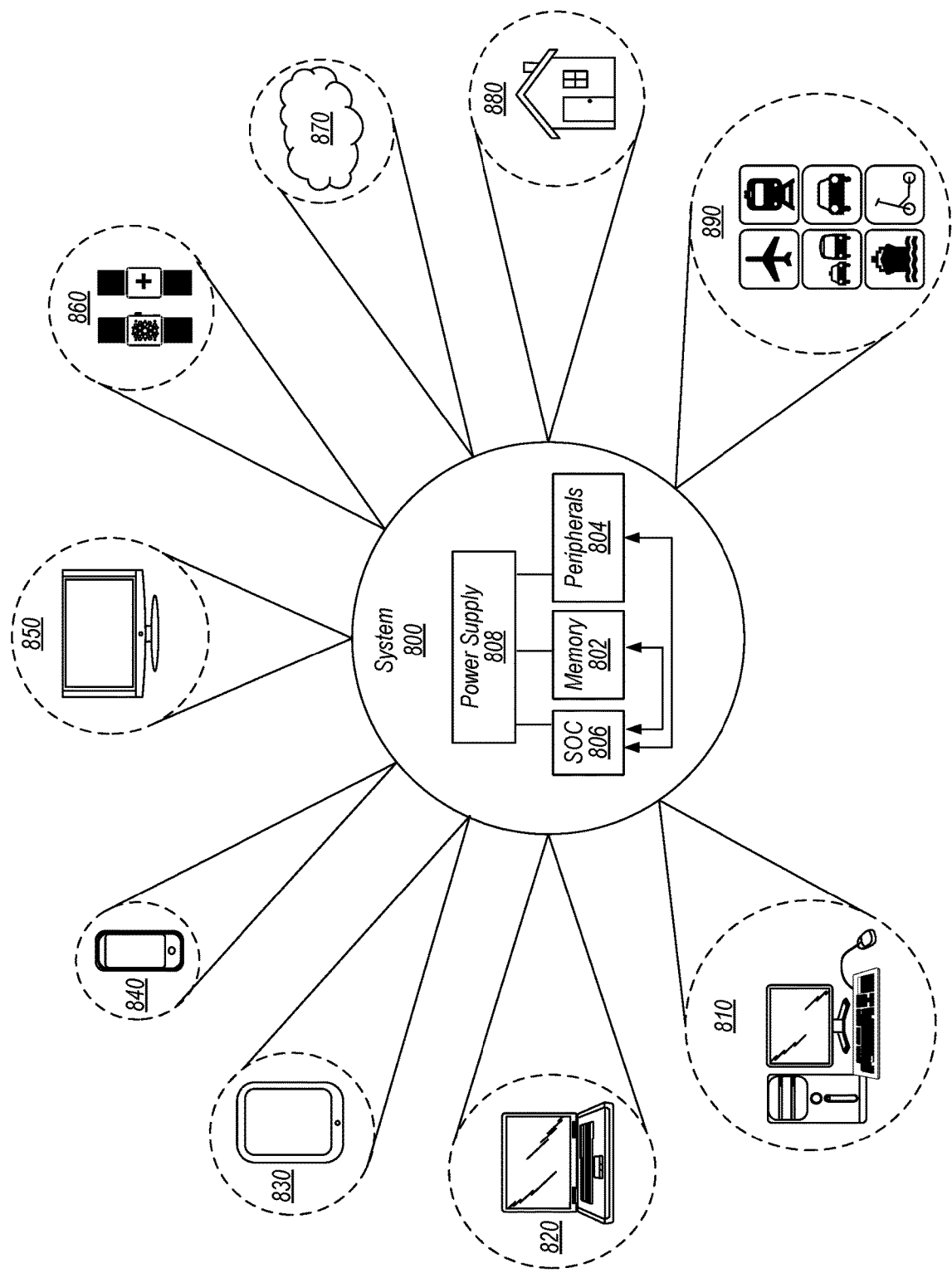
FIG. 8 is a block diagram of one embodiment of an example system.

Example System:

Turning next to FIG. 8, a block diagram of one embodiment of a system 800 is shown that may incorporate and/or otherwise utilize the methods and mechanisms described herein. In the illustrated embodiment, the system 700 includes at least one instance of a system on chip (SoC) 806 which may include multiple types of processing units, such as a central processing unit (CPU), a graphics processing unit (GPU), or otherwise, a communication fabric, and interfaces to memories and input/output devices. In various embodiments, SoC 806 is coupled to external memory 802, peripherals 804, and power supply 808.

Various embodiments of system 800 may include one or more instances of a power converter as discussed above with reference to FIGS. 1-7. These instances of a power converter may be implemented on, e.g., SoC 806, one or more integrated circuit implemented in peripherals 804, and so on.

A power supply 808 is also provided which supplies the supply voltages to SoC 806 as well as one or more supply voltages to the memory 802 and/or the peripherals 804. In various embodiments, power supply 808 represents a battery (e.g., a rechargeable battery in a smart phone, laptop or tablet computer, or other device). In some embodiments, more than one instance of SoC 806 is included (and more than one external memory 802 is included as well).

The memory 802 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 804 include any desired circuitry, depending on the type of system 800. For example, in one embodiment, peripherals 804 includes devices for various types of wireless communication, such as Wi-Fi, Bluetooth, cellular, global positioning system, etc. In some embodiments, the peripherals 804 also include additional storage, including RAM storage, solid state storage, or disk storage. The peripherals 804 include user interface devices such as a display screen, including touch display screens or multi-touch display screens, keyboard or other input devices, microphones, speakers, etc.

As illustrated, system 800 is shown to have application in a wide range of areas. For example, system 800 may be utilized as part of the chips, circuitry, components, etc., of a desktop computer 810, laptop computer 820, tablet computer 830, cellular or mobile phone 840, or television 850 (or set-top box coupled to a television). Also illustrated is a smartwatch and health monitoring device 860. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 800 may further be used as part of a cloud-based service(s) 870. For example, the previously mentioned devices, and/or other devices, may access computing resources in the cloud (i.e., remotely located hardware and/or software resources). Still further, system 800 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 8 is the application of system 800 to various modes of transportation. For example, system 800 may be used in the control and/or entertainment systems of aircraft, trains, buses, cars for hire, private automobiles, waterborne vessels from private boats to cruise liners, scooters (for rent or owned), and so on. In various cases, system 800 may be used to provide automated guidance (e.g., self-driving vehicles), general systems control, and otherwise. These any many other embodiments are possible and are contemplated. It is noted that the devices and applications illustrated in FIG. 8 are illustrative only and are not intended to be limiting. Other devices are possible and are contemplated.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated, including the following: Claim 3 (could depend from any of claims 1-2); claim 4 (any preceding claim); claim 5 (claim 4), etc. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed. FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

Numerous variations and modifications will become apparent to those skilled in the art once the above disclosure is fully appreciated. It is intended that the following claims be interpreted to embrace all such variations and modifications.

What is claimed is:
1. An apparatus comprising:
 a power converter configured to provide a regulated supply voltage, wherein the power converter includes:
  a first control loop configured to generate a first voltage based on a rate of change of the regulated supply voltage, wherein the first control loop includes:

an error amplifier configured to generate an initial value of the first voltage based on a difference between the regulated supply voltage and a reference voltage; and
a slope detection circuit configured to cause a modification of the first voltage based on the rate of change of the regulated supply voltage, wherein the error amplifier is configured to generate a modulation signal to modulate an output current generated by the slope detection circuit;
a second control loop configured to generate a second voltage based on an output current provided by the power converter;
an amplifier configured to generate a third voltage based on the first and second voltages; and
a control circuit configured to control the regulated supply voltage based on the third voltage.

2. The apparatus of claim 1, further comprising a compensation network coupled between an output of the slope detection circuit and the error amplifier, wherein the compensation network is coupled to receive an first output current from the slope detection circuit and is configured to generate, based on the first output current, the second voltage to modify the first voltage.

3. The apparatus of claim 2, wherein the slope detection circuit comprises:
a bandpass filter having a first capacitor and a second capacitor, wherein respective first terminals of the first capacitor and the second capacitor are coupled to receive the regulated supply voltage;
a transconductance amplifier having a first input coupled to a second terminal of the first capacitor, and a second input coupled to a second terminal of the second capacitor; and
a diode having an anode coupled to an output of the transconductance amplifier, and a cathode coupled to the compensation network, wherein the transconductance amplifier is configured to provide a first current through the diode to the compensation network.

4. The apparatus of claim 3, wherein the transconductance amplifier includes:
a first bipolar transistor having an emitter terminal coupled to the first input;
a second bipolar transistor having an emitter terminal coupled to the second input;
a first NMOS transistor having a gate terminal coupled to a collector of the first bipolar transistor; and
a second NMOS transistor having a gate terminal coupled to a collector of the second bipolar transistor.

5. The apparatus of claim 4, wherein the transconductance amplifier further comprises:
a first current mirror coupled to the first NMOS transistor;
a second current mirror coupled to the second NMOS transistor;
a third current mirror coupled to the first and second current mirrors and further coupled to the anode of the diode, wherein the third current mirror is configured to generate the first output current.

6. The apparatus of claim 2, further comprising a modulation circuit coupled to the anode of the diode, wherein the modulation circuit is coupled to receive a modulation signal from the error amplifier, wherein the modulation circuit is configured to cause an amount of the first current to vary inversely with an amplitude of the modulation signal.

7. The apparatus of claim 6, wherein the modulation circuit comprises a fourth current mirror including a diode-coupled device configured to receive the modulation signal as a current, wherein the diode-coupled device is configured to mirror the current to a second device having a drain terminal coupled to the anode of the diode.

8. The apparatus of claim 2, wherein the compensation network comprises:
a first resistor coupled between an output of the error amplifier and a cathode of the diode;
a second resistor coupled to the first resistor and the cathode of the diode; and
a capacitor coupled between the second resistor and a ground node.

9. The apparatus of claim 1, wherein the power converter is a buck converter comprising:
a first transistor coupled between an input voltage node and a switching node;
a second transistor coupled between the switching node and a ground node; and
an inductor coupled between the switching node and a regulated supply voltage node;
wherein the control circuit is configured to control the first and second transistors in accordance with the third voltage.

10. A method comprising:
generating, in a first control loop of a power converter, an initial value of a first voltage based on based on a difference between a regulated supply voltage and a reference voltage;
modifying, using a slope detection circuit, the first voltage based on the rate of change of the regulated supply voltage;
generating, using an error amplifier, a modulation signal;
modulating a first output current provided by the slope detection circuit, using the modulation signal, wherein the modulating includes varying an amount of the first output current with an amplitude of the modulation signal;
generating, in a second control loop of the power converter, a second voltage based on an output current provided by the power converter;
generating, using an amplifier, a third voltage based on the first and second voltages; and
controlling, using a control circuit and based on the third voltage, a regulated supply voltage provide by the power converter.

11. The method of claim 10, further comprising:
generating a first current using the slope detection circuit;
providing the first current to a compensation network, wherein the compensation network is coupled to an output of the error amplifier; and
modifying the first voltage, using the compensation network, based on the first current.

12. The method of claim 10, further comprising providing the regulated supply voltage through a bandpass filter to first and second inputs of a transconductance amplifier of the slope detection circuit.

13. The method of claim 10, wherein controlling the regulated supply voltage comprises:
the control circuit controlling switching of a first transistor coupled between an input voltage node and a switching node;
the control circuit controlling switching of a second transistor coupled between the switching node and a ground node;
wherein the control circuit is configured to control switching of the first and second transistors in accordance with the third voltage.

14. The method of claim 10, further comprising generating, using the error amplifier generating, the modulation signal as a current signal.

15. The method of claim 14, wherein the slope detection circuit includes a modulation circuit, wherein the method further comprises:
   receiving, by the modulation circuit, the current signal; and
   varying an amount of the first output current inversely with an amplitude of the current signal.

16. A system comprising:
   a power converter configured to provide a regulated supply voltage, wherein the power converter includes:
      a voltage control loop including an error amplifier configured to generate a first voltage based on a difference between the regulated supply voltage and a reference voltage, and further includes a slope detection circuit configured to modify the first voltage based on a rate of change of the regulated supply voltage, wherein the error amplifier is configured to generate a modulation signal, and wherein the slope detection circuit is configured to output a first current based on the rate of change of the regulated supply voltage and further configured to cause an amount of a first current to vary inversely with an amplitude of the modulation signal;
      a current control loop including a current sensing amplifier, wherein the current sensing amplifier is configured to generate a second voltage based on an output current provided by the power converter;
      an amplifier configured to generate a third voltage based on the first and second voltages; and
      a switch control circuit configured to control switching of first and second transistors of the power converters based on the third voltage.

17. The system of claim 16, wherein the slope detection circuit includes:
   a bandpass filter having a first capacitor and a second capacitor, wherein respective first terminals of the first capacitor and the second capacitor are coupled to receive the regulated supply voltage;
   a transconductance amplifier having a first input coupled to a second terminal of the first capacitor, and a second input coupled to a second terminal of the second capacitor; and
   a diode having an anode coupled to an output of the transconductance amplifier, and a cathode coupled to a compensation network, wherein the transconductance amplifier is configured to provide the first current through the diode to the compensation network.

18. The system of claim 17, wherein the compensation network is coupled to the error amplifier, and wherein the compensation network includes:
   wherein the compensation network comprises:
   a first resistor coupled between an output of the error amplifier and a cathode of the diode;
   a second resistor coupled to the first resistor and the cathode of the diode; and
   a capacitor coupled between the second resistor and a ground node.

19. The system of claim 17, wherein the slope detection circuit further includes a modulation circuit coupled to the anode of the diode and further coupled to receive, from the error amplifier, the modulation signal, wherein the error amplifier is configured to generate the modulation signal as a current signal.

20. The system of claim 19, wherein the modulation circuit is configured to cause an amount of the first current to vary inversely with the amplitude of the current signal.

* * * * *